(12) United States Patent
Mann et al.

(10) Patent No.: US 6,931,342 B2
(45) Date of Patent: Aug. 16, 2005

(54) REGULATING DEVICE AND METHOD TO REGULATE AND/OR CALIBRATE A MIXING VALVE

(75) Inventors: Karsten Mann, Stuttgart (DE); Oliver Kaefer, Murr (DE)

(73) Assignee: Robert Bosch GmbH (DE)

( * ) Notice: Subject to any disclaimer, the term of this patent is extended or adjusted under 35 U.S.C. 154(b) by 0 days.

(21) Appl. No.: 10/698,162

(22) Filed: Oct. 31, 2003

(65) Prior Publication Data

US 2004/0122612 A1 Jun. 24, 2004

(30) Foreign Application Priority Data

Dec. 22, 2002 (DE) .......................................... 10261793

(51) Int. Cl.$^7$ ........................ G01L 25/00; G01K 15/00; G05D 11/00
(52) U.S. Cl. ........................ 702/105; 702/99; 702/100; 137/109
(58) Field of Search .......................... 702/105, 99, 100; 137/3, 8, 88, 109, 337

(56) References Cited

U.S. PATENT DOCUMENTS 4,694,512 A * 9/1987 Knebel et al. .................. 4/668
6,161,383 A * 12/2000 Aschner et al. ............... 60/602

* cited by examiner

Primary Examiner—John Barlow
Assistant Examiner—Meagan S. Walling
(74) Attorney, Agent, or Firm—Michael Best & Friedrich LLP

(57) ABSTRACT

The invention relates to a method to regulate and/or calibrate a mixing valve, in particular in a cooling circuit of an internal combustion engine, with which a volume flow can be separated into two partial flows as a function of controlled quantity, whereby the separating ratio of the mixing valve is determined by comparing a target quantity with an actual measured quantity. It is planned that a correction value that is computed during operation is taken into consideration in calculating the separating ratio or mixing ratio (MR). In addition, the invention relates to a corresponding regulating device to regulate and/or calibrate a mixing valve. In this case, it is planned that a correction value that is computed during operation can be taken into consideration in calculating the separating ratio.

16 Claims, 3 Drawing Sheets

REGULATING DEVICE AND METHOD TO REGULATE AND/OR CALIBRATE A MIXING VALVE

Figure 1:
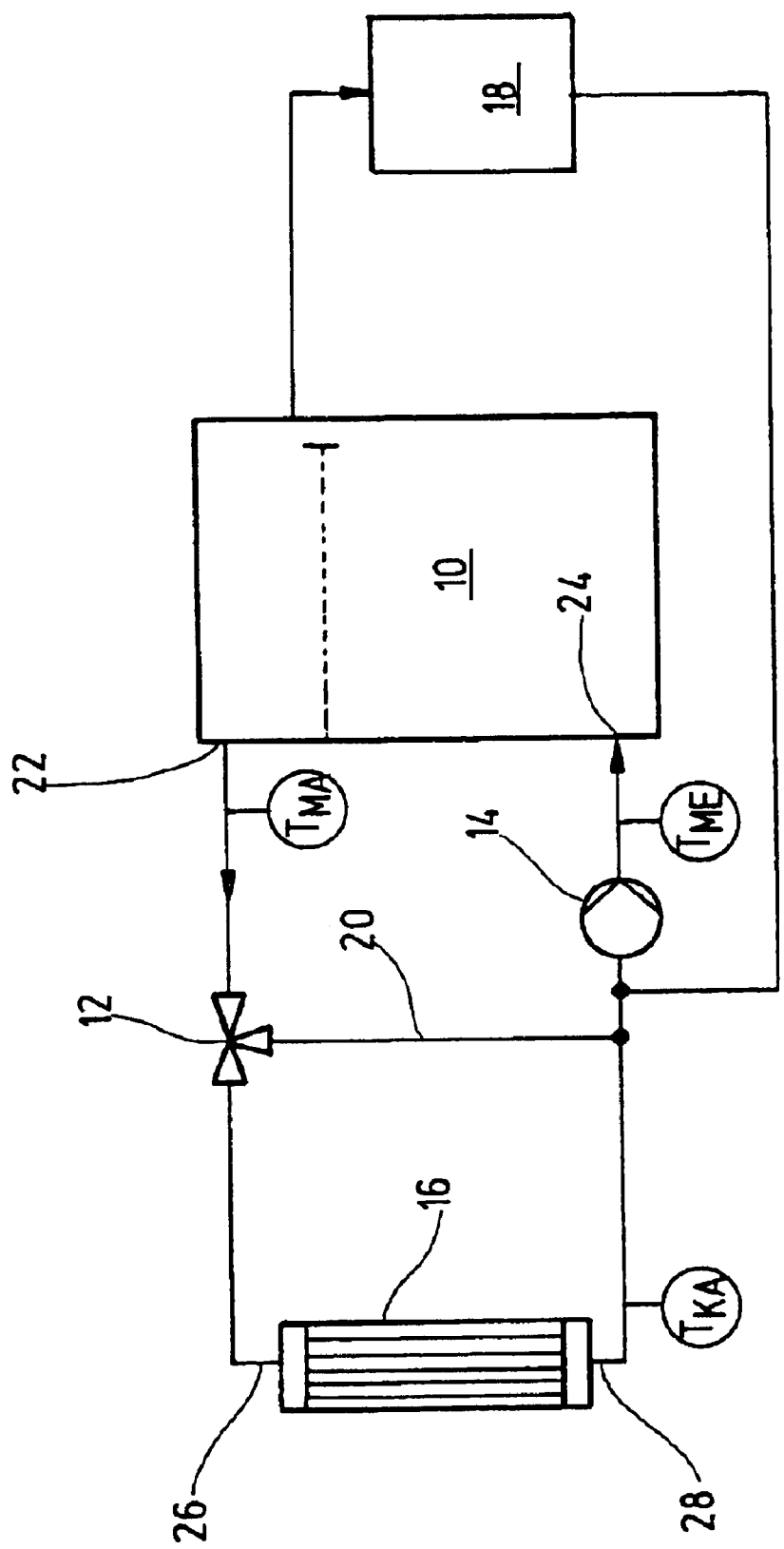

The invention relates to a method to regulate and/or calibrate a mixing valve in accordance with the pre-characterizing clause of claim 1, as well as a regulating device to regulate and/or calibrate a mixing valve in accordance with the pre-characterizing clause of claim 9.

STATE OF THE ART

In the case of known cooling circuits in internal combustion engines, an engine inlet temperature of a cooling fluid is normally regulated via a mixing valve. The mixing valve provides for a variable distribution of a cooling fluid flow from the cooling circuit of the internal combustion engine between a heat exchanger and bypass line. As long as the internal combustion engine has not reached its operating temperature, normally a larger portion of the cooling fluid flow is directed past the heat exchanger via the bypass line and is again fed directly to the engine cooling circuit without substantial cooling.

The engine inlet temperature of the cooling fluid is yielded from the mixture of the volume flows from the cooler and the bypass line, whereby the bypass temperature corresponds to the engine outlet temperature. The mixing ratio of the mixing valve in the cooling circuit is normally regulated on the basis of temperature values at various locations in the cooling circuit.

In addition, pilot control of the valve position of the mixing valve is known in the case of prescribing default of a dynamically changing target value or a changing engine load. A valve characteristic curve, in which a non-linear relationship between the valve position and the mixing ratio is stored in the system, is normally stored in a central control unit. In other words, a defined valve position is allocated to every target value for the mixing ratio.

This type of regulation does not provide for the actual adjusting mixing ratio to be compared to the prescribed mixing ratio. However, these types of mixing valves feature certain tolerances so that the adjusting mixing ratio is not only dependent on the valve position, but also on the volume flow, a system characteristic curve and the temperature of the coolant, in particular.

All three factors can be subject to strong changes and fluctuations under real conditions. Consequently, the prescribed mixing ratio deviates from the adjusting mixing ratio, which is a particular disadvantage for dynamic pilot control.

ADVANTAGES OF THE INVENTION

A method in accordance with the invention to regulate a mixing valve, in particular in a cooling circuit of an internal combustion engine, with which a volume flow can be separated into two partial flows as a function of controlled quantity, provides that the separating ratio of the mixing valve is determined by comparing a target quantity with an actual measured quantity. The method in accordance with the invention provides that a correction value that is computed during operation is taken into consideration in calculating the separating ratio. The correction value can be a function in particular of a volume flow through the mixing valve.

This makes it possible to equalize and fully stabilize the dynamic effects in the regulation of the mixing valve. If a measured engine inlet temperature deviates from the desired target temperature at a stationary operating point in the case of pure pilot control, the mixing ratio characteristic curve stored for this will not correspond to the physical conditions. If, for example, the engine inlet temperature is greater than the target temperature, in the case of the same desired mixing ratio, the valve would have to open the cooler branch further so that the mixing ratio characteristic curve has to be corrected downwards. It behaves in a corresponding manner in the opposite case. A correction value, which is preferably stored in a correction characteristic curve, is derived from the deviation of the two values.

An embodiment of the method provides that additional characteristic quantities, particularly an outside temperature and/or an air flow rate through cooler, be taken into consideration in forming the correction value. It is preferred that a plurality of correction values is stored in a correction characteristic curve. The correction values or the correction characteristic curves can preferably be stored in a characteristic diagram. An ascending slope of the mixing ratio characteristic curve at the momentary operating point can be used to calculate the actual correction value. Additional vehicle parameters can enter into the correction values such as driving speed, an air mass flow through the cooler, a volume flow in the cooling circuit, an engine load, a temperature and other additional quantities.

It is preferred that the mixing valve is permanently calibrated by means of taking the correction values into consideration so that taking the cited additional parameters into consideration does not have to take place permanently, but can be used solely for calibration at regular time intervals.

A regulation device in accordance with the invention to regulate a mixing valve, in particular in a cooling circuit of an internal combustion engine, with which a volume flow is separated into two partial flows as a function of controlled quantity, whereby the separating ratio of the mixing valve can be determined by comparing a target quantity with an actual measured quantity, provides that a correction value, which can depend in particular on a volume flow through the mixing valve, is taken into consideration in calculating the separating ratio.

Additional vehicle parameters such as, in particular, an outside temperature, an air flow rate, a driving speed, an air mass flow through the cooler, a volume flow, an engine load, etc., can be taken into consideration in forming the correction value.

Additional features and advantageous further developments of the invention are yielded from the dependent claims as well as the subsequent description of the figures.

DRAWINGS

The invention is described in greater detail in the following on the basis of a preferred exemplary embodiment making reference to the enclosed drawings. They show:

FIG. 1 A schematic block diagram of a cooling circuit of an internal combustion engine.

Figure 2:
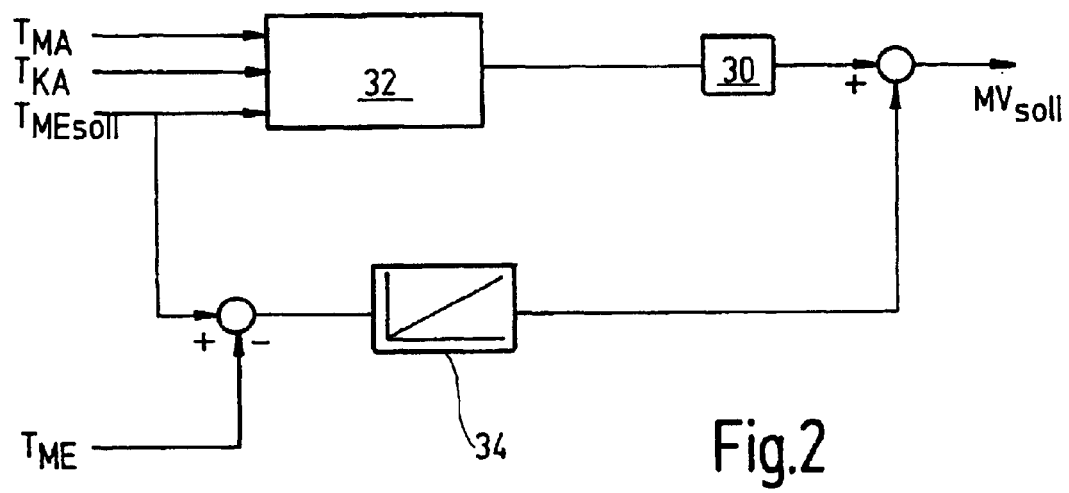

FIG. 2 A regulation algorithm for the valve calibration in accordance with the invention.

Figure 3:
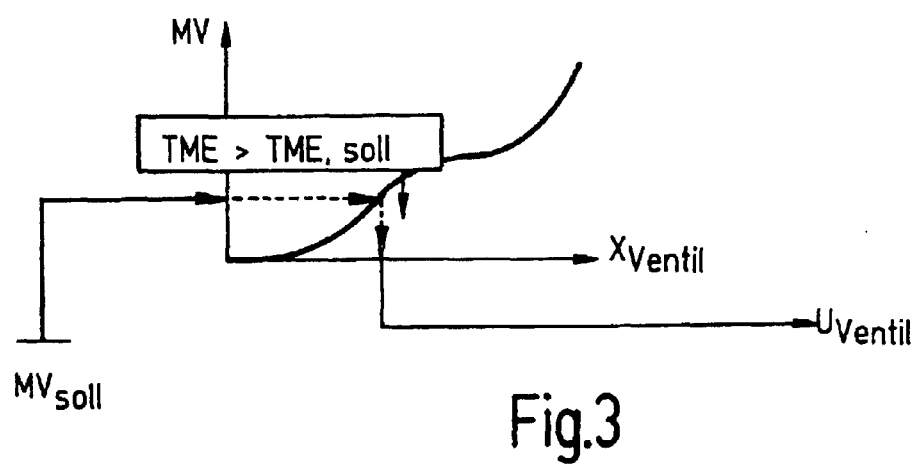

FIG. 3 A control unit characteristic curve of a mixing valve of the cooling circuit from FIG. 1.

Figure 4:
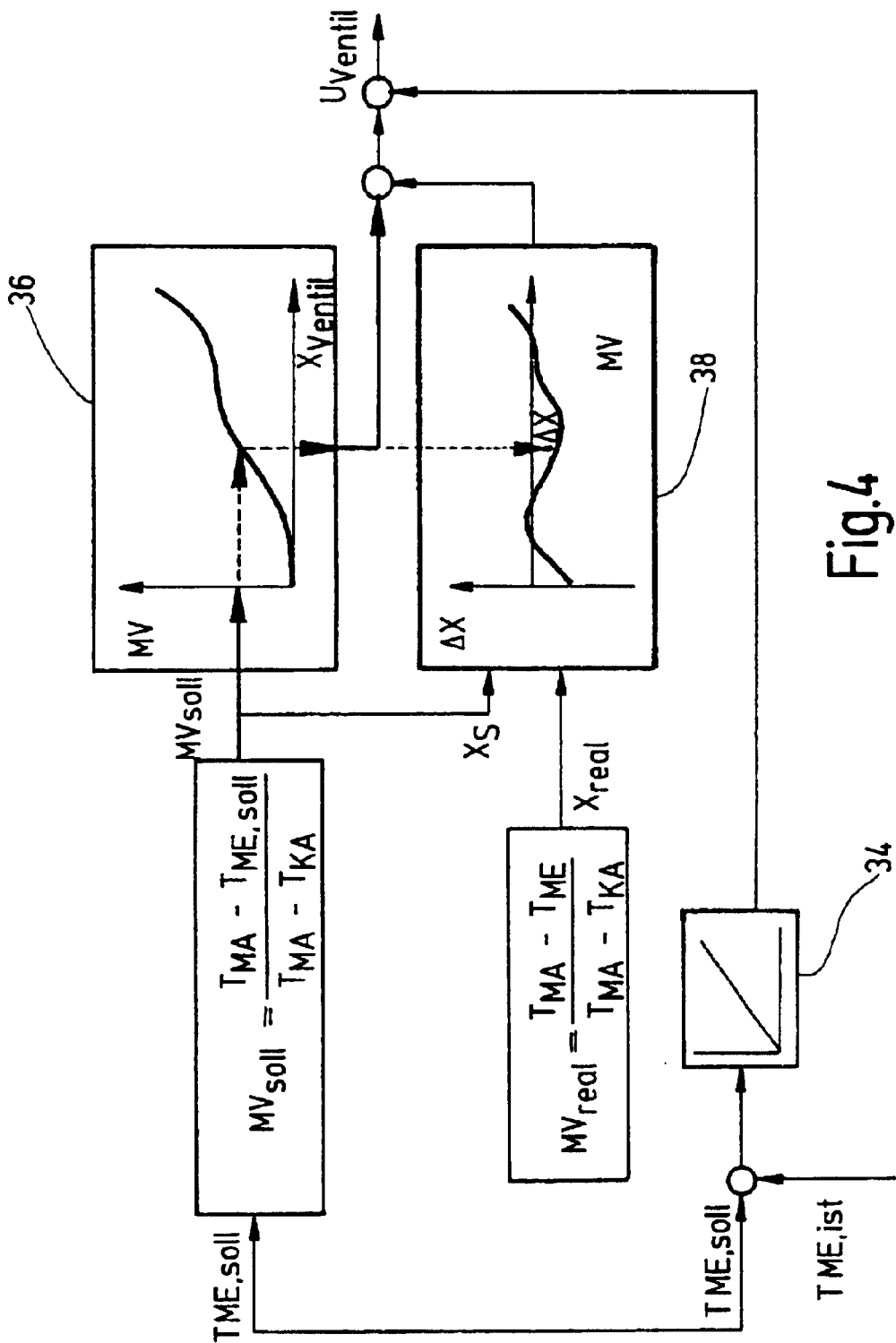

FIG. 4 A detailed regulating relationship for determining a corrected valve setting and for calibrating the mixing valve.

DESCRIPTION OF THE EXEMPLARY EMBODIMENTS

FIG. 1 shows a schematic block diagram of a cooling circuit of an internal combustion engine 10 like those that can be installed particularly in a motor vehicle. A feed pump 14 provides for the circulation of a cooling fluid between an outlet 22 and an inlet 24 of a cooling circuit of the internal combustion engine 10. The outlet 22 is preferably provided on a hot location of the internal combustion engine 10, particularly in a cylinder head, while the inlet 24 is preferably provided on a cooler location in a lower area of the internal combustion engine 10.

Provided between the outlet 22 and the inlet 24 is a first heat exchanger 16, which is preferably cooled by the air stream and provides for cooling of the cooling fluid between a cooler inlet 26 and a cooler outlet 28. Provided between the outlet 22 of the internal combustion engine 10 and the cooler inlet 26 of the first heat exchanger 16 is a mixing valve 12, which facilitates a separation of the cooling fluid flow between the line to the cooler inlet 26 and a bypass line 20, which discharges directly into the inlet of the feed pump 14. A second heat exchanger 18 is connected to the circuit of the first heat exchanger 16 and provides, for example, for a variable heating of the vehicle's passenger compartment.

If the total volume flow circulated by the feed pump 14 is standardized to a value of one and if a value of x is determined for the volume flow through the first heat exchanger 16, the engine inlet temperature $T_{EI}$ at the inlet 24 can be calculated from the following equation (1):

$$T_{EI} = T_{EO} \cdot (1-x) + T_{CO} \cdot x \tag{1}$$

with $T_{EO}$: Engine outlet temperature at the outlet 22 and
$T_{CO}$: Outlet temperature at the cooler outlet 28.

If a target temperature $T_{EItarget}$ is used instead of engine inlet temperature $T_{EI}$ and the equation (1) is solved in accordance with the mixing ratio x=MR, one obtains the following equation (2):

$$x = MR_{target} = \frac{T_{EO} - T_{EItarget}}{T_{EO} - T_{CO}}, \tag{2}$$

which supplies a value for the target mixing ratio $MR_{target}$.

The mixing valve 12 can be controlled in accordance with the invention in such a way that, in addition to an engine outlet temperature on the outlet 22, an engine inlet temperature on the inlet 24 and a cooler outlet temperature on the cooler outlet 28, a correction value, which is formed from various vehicle parameters, is taken into consideration to form the mixing ratio. The correction value, for example, can take additional parameters into consideration such as a volume flow in the cooler circuit, an air flow rate in the first heat exchanger 16, an engine load as well as other quantities.

FIG. 2 illustrates a typical regulation algorithm, which is based on the regulation of the coolant temperature between the engine outlet and the engine inlet. In this case, reference number 32 characterizes a mixing equation, which is used to calculate a target mixing ratio $MR_{target}$ from the input values $T_{EO}$ (engine outlet temperature), $T_{CO}$ (cooler outlet temperature) and $T_{EItarget}$ (target value for engine inlet temperature). A difference between the target value for the engine inlet temperature $T_{EItarget}$ and the actually measured engine inlet temperature $T_{EI}$ is added to the target value for the mixing ratio $MR_{target}$ after passing through an integral control unit 34 so that the regulating characteristic curve for the mixing valve 12 is thereby formed. Instead of an integral control unit 34, a control unit with other regulating characteristics can alternatively be provided to superimpose the mixing equation 32. In this connection, the reference number 30 characterizes the intervention point for the valve calibration in accordance with the invention.

FIG. 3 illustrates an exemplary relationship between a valve setting $x_{valve}$ and the resulting mixing valve ratio MR. It shows an adaptation of the mixing ratio for a specific valve setting $x_{valve}$, if, for example, the engine inlet temperature $T_{EI}$ is greater than the target temperature $T_{EItarget}$. In this case, the mixing ratio characteristic curve will be shifted downward, which occurs by taking a corresponding characteristic value into consideration. In this connection, the value $u_{valve}$ designates a corrected target value for the valve position. A plurality of correction characteristic values shall preferably be stored in diagrams or characteristic diagrams.

FIG. 4 again shows a more detailed connection diagram of regulating relationship between a target value for the engine inlet temperature $T_{EItarget}$ and a corrected target value $u_{valve}$ for valve position of the mixing valve 12. A value for the target mixing ratio $MR_{target}$ is determined from the described equation (2):

$$x_{target} = MR_{target} = \frac{T_{EO} - T_{EItarget}}{T_{EO} - T_{CO}}. \tag{2}$$

This equation characterizes a static pilot control in the temperature management process. A valve control value $x_{valve}$ of the mixing valve 12 is allocated to every value for the target mixing ratio $MR_{target}$. This allocation regulation is stored in the so-called mixing ratio characteristic curve 36.

A correction value $\Delta x$ for the valve control value is computed by means of the correction characteristic curve 38 from the calculation of the real mixing ratio:

$$x_{real} = MR_{real} = \frac{T_{EO} - T_{EI}}{T_{EO} - T_{CO}}. \tag{3}$$

The corrected valve control value $u_{valve}$ is yielded from adding the control value $x_{valve}$ from the valve characteristic curve 36 and the correction value $\Delta x$ from the correction characteristic curve 38.

In addition, the control unit 34, e.g., an integral control unit, whose output value can be added to the corrected valve control value $u_{valve}$ as an additional correction factor, can alternatively be superimposed on the target mixing radio $MR_{target}$ (also see FIG. 2 in this regard). The input of the integral control unit 34 compares the target value $T_{EItarget}$ of the engine inlet temperature with its actual value $T_{EIactual}$.

The regulation algorithm in accordance with the invention makes precise and quick reacting regulation of a mixing valve possible as well as its permanent calibration.

What is claimed is:

1. Method for calibrating and/or regulating a mixing valve (12) in a cooling circuit of an internal combustion engine (10), with which a cooling fluid flow in the cooling circuit can be separated into two partial flows through a heat exchanger (16) and through a bypass line (20) respectively as a function of an engine outlet temperature ($T_{EO}$), a cooler outlet temperature ($T_{CO}$) and a target engine inlet temperature ($T_{EItarget}$), the method comprising: computing a target mixing ratio ($MR_{target}$) of the mixing valve (12) from the engine outlet temperature ($T_{EO}$), the cooler outlet temperature ($T_{CO}$) and the target engine inlet temperature ($T_{EItarget}$), computing an actual mixing ratio ($MR_{real}$) of the mixing valve (12) from the engine outlet temperature ($T_{EO}$), the cooler outlet temperature ($T_{CO}$) and the actual engine inlet temperature ($T_{EIreal}$), computing a correction value ($\Delta x$) for a valve control value ($u_{valve}$) of the mixing valve (12) from the actual mixing ratio ($MR_{real}$) during operation, and adding the correction value ($\Delta x$) to the valve control value ($u_{valve}$).

2. Method according to claim 1, characterized in that the actual mixing ratio ($MR_{real}$) is computed to calculate the correction value ($\Delta x$) and is compared with the target mixing ratio ($MR_{target}$).

3. Method according to claim 1, characterized in that the correction value ($\Delta x$) is formed from an output quantity of a superimposed control unit (34).

4. Method according to claim 3, characterized in that the superimposed control unit (34) is an integral control unit.

5. Method according to claim 1, characterized in that additional characteristic quantities, particularly a volume flow through the mixing valve (12), an outside temperature and/or an air flow rate through the heat exchanger (16) are taken into consideration in forming the correction value ($\Delta x$).

6. Method according to claim 1, characterized in that a plurality of correction values is stored in a correction characteristic curve.

7. Method according to claim 1, characterized in that a plurality of correction values or a plurality of correction characteristic curves are stored in a characteristic diagram.

8. Method according to claim 1, characterized in that the mixing valve (12) is permanently calibrated taking into consideration the correction values ($\Delta x$).

9. Regulating device for regulating and/or calibrating a mixing valve (12) in a cooling circuit of an internal combustion engine (10), with which a cooling fluid flow in the cooling circuit can be separated into two partial flows through a heat exchanger (16) and through a bypass line (20) respectively as a function of an engine outlet temperature ($T_{EO}$), a cooler outlet temperature ($T_{CO}$) and a target engine inlet temperature ($T_{EItarget}$), the device comprising: means for computing a target mixing ratio ($MR_{target}$) of the mixing valve (12) from the engine outlet temperature ($T_{EO}$), the cooler outlet temperature ($T_{CO}$) and the target engine inlet temperature ($T_{EItarget}$), for computing an actual mixing ratio ($MR_{real}$) of the mixing valve (12) from the engine outlet temperature ($T_{EO}$), the cooler outlet temperature ($T_{CO}$) and the actual engine inlet temperature ($T_{EIreal}$), for computing a correction value ($\Delta x$) for a valve control value ($x_{valve}$) of the mixing valve (12) from the actual mixing ratio ($MR_{real}$) during operation, and for adding the correction value ($\Delta x$) to the valve control value ($x_{valve}$).

10. Regulating device according to claim 9, characterized by means for deriving the correction value ($\Delta x$) from the computation of the actual mixing ratio ($MR_{real}$) and a comparison with the target mixing ratio ($MR_{target}$).

11. Regulating device according to claim 9, characterized by means for deriving the correction value ($\Delta x$) from an output quantity of a superimposed control unit (34).

12. Regulating device according to claim 11, characterized in that the superimposed control unit (34) is an integral control unit.

13. Regulating device according to claim 9, characterized by means for forming the correction value ($\Delta x$) from additional characteristic quantities, particularly a volume flow through the mixing valve (12), an outside temperature and/or an air flow rate through the heat exchanger (16).

14. Regulating device according to claim 9, characterized in that a plurality of correction values is stored in a correction characteristic curve.

15. Regulating device according to claim 9, characterized in that a plurality of correction values or a plurality of correction characteristic curves are stored in a characteristic diagram.

16. Regulating device according to claim 9, characterized by means for permanently calibrating the mixing valve (12) taking into consideration the correction values ($\Delta x$).

* * * * *